United States Patent
Ho et al.

(10) Patent No.: US 7,225,259 B2
(45) Date of Patent: May 29, 2007

(54) SERVICE TUNNEL OVER A CONNECTIONLESS NETWORK

(75) Inventors: Chi Fai Ho, Sunnyvale, CA (US); Alexander Bachmutsky, San Jose, CA (US); Henry Tzeng, Cupertino, CA (US); Ravi Bail Bhat, Bangalore (IN); Andrzej Koscinski, Mountain View, CA (US); Himansu Sahu, Mountain View, CA (US)

(73) Assignee: Nokia Inc., Irving, TX (US)

( * ) Notice: Subject to any disclaimer, the term of this patent is extended or adjusted under 35 U.S.C. 154(b) by 556 days.

(21) Appl. No.: 09/792,398

(22) Filed: Feb. 21, 2001

(65) Prior Publication Data

US 2002/0116501 A1 Aug. 22, 2002

(51) Int. Cl.
*G06F 15/16* (2006.01)
(52) U.S. Cl. ........................ 709/227; 709/238; 370/230
(58) Field of Classification Search ........ 709/217–227, 709/200–203, 238
See application file for complete search history.

(56) References Cited

U.S. PATENT DOCUMENTS

| | | | | |
|---|---|---|---|---|
| 6,041,166 A | * | 3/2000 | Hart et al. ................... | 709/238 |
| 6,094,437 A | * | 7/2000 | Loehndorf et al. ......... | 370/420 |
| 6,097,719 A | * | 8/2000 | Benash et al. .............. | 370/352 |
| 6,137,791 A | | 10/2000 | Frid et al. | |
| 6,512,754 B2 | * | 1/2003 | Feder et al. ................. | 370/338 |
| 6,522,627 B1 | * | 2/2003 | Mauger ....................... | 370/230 |
| 6,633,571 B1 | * | 10/2003 | Sakamoto et al. .......... | 370/401 |
| 6,665,273 B1 | * | 12/2003 | Goguen et al. ............. | 370/252 |
| 6,732,234 B1 | * | 5/2004 | Rowlands et al. .......... | 711/117 |
| 6,985,935 B1 | * | 1/2006 | Zhang et al. ................ | 709/219 |

FOREIGN PATENT DOCUMENTS

| | | |
|---|---|---|
| EP | 1 001 577 A1 | 5/2000 |
| WO | WO 00/30313 | 5/2000 |

OTHER PUBLICATIONS

PCT Notification of Transmittal of The International Search Report or The Declaration for PCT Counterpart Application No. PCT/US02/04645 Containing International Search Report (Sep. 6, 2002).
E. Rosen, et al., "BGP/MPLS VPNs," RFC 2547, Internet Engineering Task Force, Mar. 1999.
W. Townsley, et al., Layer Two Tunneling Protocol "'L2TP'," RFC 2661, Internet Engineering Task Force, Aug. 1999.
D. McPherson, et al., "L2TP Service Type," Internet Engineering Task Force, http://www.ietf.org/proceedings/00dec/I-D/draft-ietf-l2tpext-svctype-00.txt, Aug. 2000.

* cited by examiner

*Primary Examiner*—Moustafa M. Meky
(74) *Attorney, Agent, or Firm*—Squire, Sanders & Dempsey L.L.P.

(57) ABSTRACT

A method for establishing a service tunnel for private internet protocol services over a connectionless network. The private internet protocol services are transported over the service tunnel in accordance with selected respective private internet protocol services.

25 Claims, 11 Drawing Sheets

SERVICE TUNNEL OVER A CONNECTIONLESS NETWORK

FIELD OF THE INVENTION

The present invention pertains to the field of internet protocol (IP) networks. More particularly, the invention relates to a service tunnel for private IP services over a connectionless network.

BACKGROUND OF THE INVENTION

Enterprises with remote sites, such as corporations, consulting firms, and law firms, have typically formed wide area networks ("WANs") using frame relay networks or time division multiplexing ("TDM") leased lines. Some larger enterprises have formed WANs using asynchronous transfer mode ("ATM") networks. Those enterprise WANs over the connection-oriented frame relay, TDM, and ATM networking technologies typically provide connectivity between computers in the various enterprise sites, reachability among users in the sites, guaranteed quality of service, priority schemes regarding communications, and relatively good security for data and addresses.

In contrast to the enterprise-oriented connection-oriented networking technologies with centralized control is the Internet, which has exploded in popularity in recent years. The Internet is a loose collection of networks organized into a multilevel hierarchy using a wide variety of interconnection technologies. The Internet is a connectionless datagram switching scheme bound together by addressing, routing, and IP but with decentralized control. Rather than focusing on enterprise communications, the Internet is focused on global packet transport, which involves the forwarding of packets. The Internet is widely used for accessing the World-Wide Web and for global email, but has generally been deficient with respect to certain communications services valued by enterprises, such as security, connectivity, and quality of service.

Because of the widespread use of different kinds of wide-area network technologies, such as frame relay, ATM, TDM, and IP, network providers have had to build and maintain several different networks to satisfy the needs of network users, such as individuals and enterprises. This has been very expensive. Moreover, enterprises have had to pay high fees to use the connection-oriented WAN technologies in order to get the level of service demanded by those enterprises.

Attempts have been made to make the Internet more enterprise friendly. For example, a virtual private network ("VPN") with an IP backbone is described in *BGP/MPLS VPNs* by E. Rosen and Y. Rekhter, Request for Proposal ("RFC") 2547, Network Working Group, Internet Engineering Task Force ("IETF") (March 1999) ("RFC 2547"). A VPN is an IP connection between two sites over a public IP network that has its payload traffic encrypted so that only the source and destination can decrypt the traffic packets. The RFC 2547 document discloses using multiprotocol label switching ("MPLS") for forwarding packets over the background and using border gateway protocol ("BGP") for distributing routes over the backbone. Although RFC 2547 briefly suggests some quality of service techniques, the focus of RFC 2547 is on the transport of packets. Moreover, the VPN scheme described in RFC 2547 is a transport tunnel that starts at the network side, rather than a scheme that starts at the end-user's side.

Another attempt to make the Internet more enterprise friendly is the layer two tunneling protocol ("L2TP") described in *Layer Two Tunneling Protocol "L2TP"* by W. Townsley et al., RFC 2661, Network Working Group, IETF (August 1999) ("RFC 2661"). The RFC 2661 document discloses a scheme for facilitating the tunneling (i.e., encapsulating) of point-to-point protocol ("PPP") packets across an intervening network in a way that is as transparent as possible to both end-users and applications. Although RFC 2661 describes a scheme that starts at the end-user's side, the focus of RFC 2661 is PPP and the transport of packets.

SUMMARY OF THE INVENTION

A method is described for establishing a service tunnel for private internet protocol services over a connectionless network. The private internet protocol services are transported over the service tunnel in accordance with selected respective private internet protocol services.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method is described for establishing a service tunnel for private internet protocol (IP) services over a connectionless network. The service tunnel allows the encapsulation and transport of private IP packets containing data, voice, and video information over an intervening connectionless network between end-users and the providing of enterprise services to end-users. For one embodiment, the services provided by the service tunnel include connectivity, addressing, reachability, forwarding, peering, and premium services, such as priority and quality of service.

As described in more detail below, for one embodiment the service tunnel is a modified layer two tunneling protocol ("L2TP") tunnel and the connectionless network is an IP network. For an alternative embodiment, the connectionless network is a multiprotocol label switching ("MPLS") network.

Figure 1:
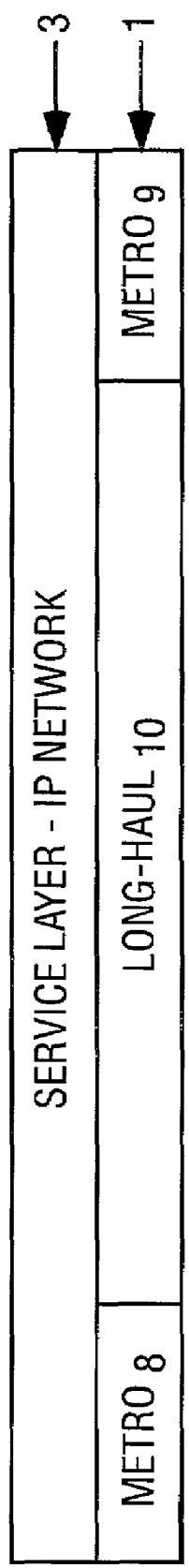
FIG. 1 shows a service layer over an optical network.

FIG. 1 illustrates the layered network architecture for one embodiment of the present invention. Layer 1 includes the long haul portion 10 and the local metropolitan sections 8 and 9. For one embodiment, the long haul portion 10 and the metropolitan sections 8 and 9 comprise an optical network between network carriers.

Layer 1 is the network interface layer. Layer 1 connects a host to the local network hardware. Layer 1 makes a connection to the physical medium. Layer 1 uses a specific protocol for accessing the medium. Layer 1 also places data into frames. Layer 1, however, does not provide enterprise services to end-users.

Layer 1 shown in FIG. 1 includes the physical and data link layers of the Open System Interconnect ("OSI") reference model developed by the International Organization for Standards ("ISO").

Layer 3 shown in FIG. 1 is the Internet protocol network layer, which for one embodiment is also the service layer. In other words, in addition to being the Internet protocol layer, layer 3 provides the enterprise services to end-users. The enterprise services are also referred to as subscriber services or just services.

Layer 3 is where the Internet protocol is found. Layer 3 transfers user messages from source host to destination host. Layer 3 is a connectionless datagram service. In layer 3, root selection is based on some metric. Layer 3 uses IP addresses as a road map to locate a host. Layer 3 relies on routers or switches. Layer 3 includes the Internet control message protocol ("ICMP"), which uses an IP datagram to carry message about the state of the communications environment.

For one embodiment, layer 3 also includes a service tunnel for providing subscriber services to end-users. The service tunnel is a modified L2TP tunnel. For one embodiment, the subscriber services are offered using layer 3 without the use of connection-oriented technologies such as frame relay, TDM, and ATM. An intended advantage of the service tunnel is to help to reduce the expenses of network providers by helping to reduce the number of networks needed to be built and maintained. An another intended advantage of the service tunnel is to reduce or eliminate the high fees otherwise required by connection-oriented WAN technologies.

The service tunnel found in layer 3 provides services for layers higher than layer 3 in addition to services for layer 3. For example, the service tunnel also provides services for the IP layer 3, the transport layer four and the application layer five (not shown). The transport layer four includes the transmission control protocol ("TCP") and the user datagram protocol ("UDP"). Under the OSI model, the service tunnel provides services for the network layer, the transport layer, the session layer, the presentation layer, and the application layer. The layers 3 and above are also referred to as layers 3 plus.

For an alternative embodiment, layer 3 contains MPLS. MPLS is a connectionless optimized switching technology for IP networks. MPLS involves prepending IP packets with a routing label at an edge of an "MPLS cloud" and performing all forwarding within the cloud based on the label value. For that alternative embodiment, the service tunnel found in layer 3 would run over MPLS. That service tunnel would provide services for layers 3 plus.

Figure 2:
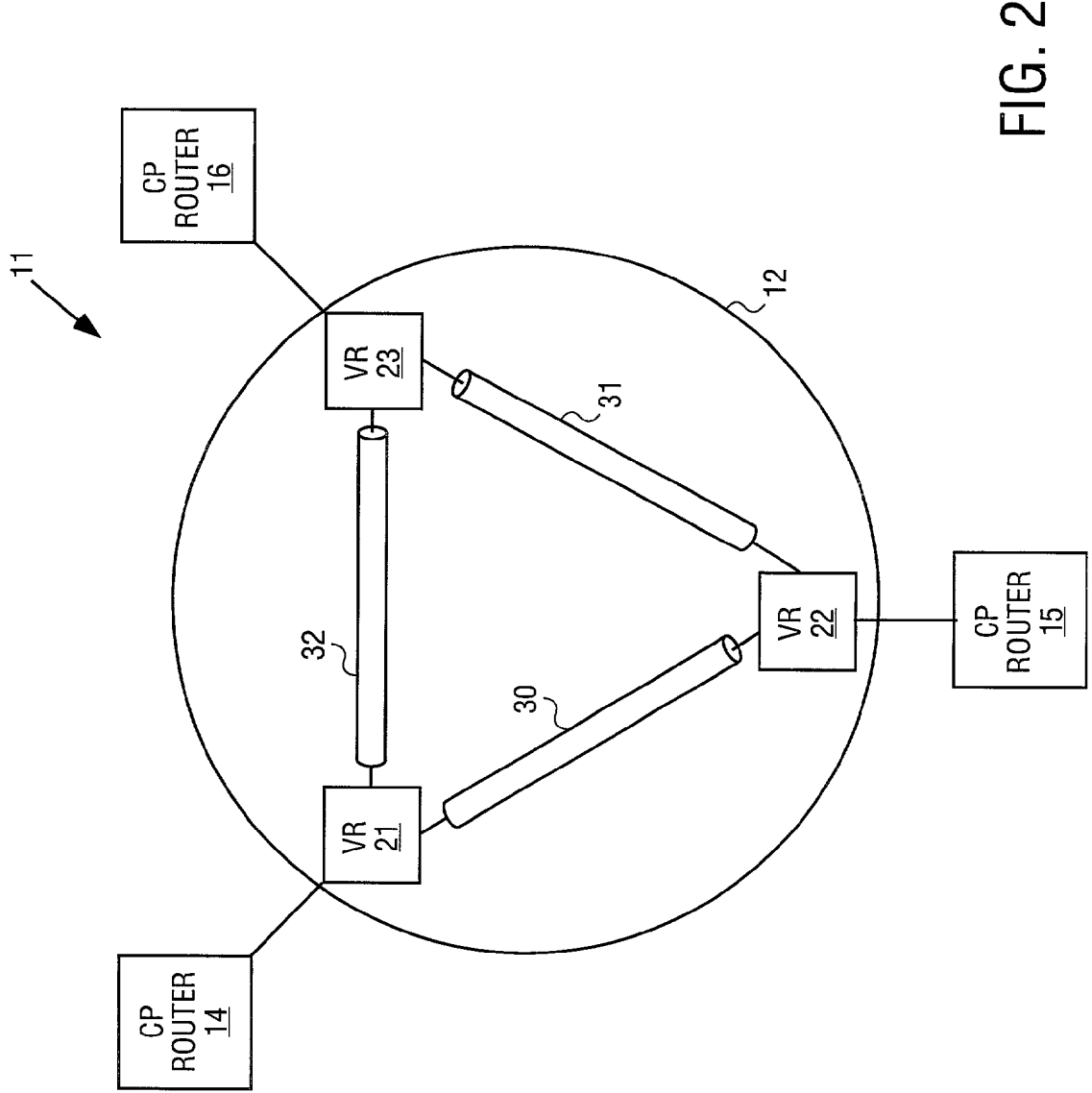
FIG. 2 illustrates service tunnels in a network.

FIG. 2 illustrates a network configuration 11 for implementing an embodiment of the present invention. The public IP network 12 includes virtual routers 21, 22, and 23. Virtual routers 21–23 provide access to the global Internet, including access to the World Wide Web. Virtual routers 21–23 thus use IP protocol.

For an alternative embodiment, network 12 is an MPLS network. For that alternative embodiment, virtual routers 21–23 would use MPLS protocol in addition to IP protocol.

For one embodiment, customer premises ("CP") routers 14, 15, and 16 are at various sites of a single enterprise. For one embodiment, customer premises router 14 is coupled to virtual router 21 via a local area network ("LAN") or a wide area network ("WAN"). Customer premises router 15 is coupled to virtual router 22 via a LAN or WAN. Customer premises router 16 is coupled to virtual router 23 via LAN or WAN.

FIG. 2 also illustrates service tunnels 30, 31, and 32. Service tunnel 30 is between virtual router 21 and virtual router 22. Service tunnel 31 is between virtual router 22 and virtual router 23. Service tunnel 32 is between virtual router 21 and virtual router 23. Even though each service tunnel is established between two virtual routers, from the point of view of the end users (i.e., subscribers) at each of the customer premises routers 14–16, each service tunnel appears to start from the end-user side, not the network side. This is because the service tunnel provides services to the end users. This contrasts with a transport tunnel, such as MPLS, that starts at the network side.

FIG. 2 shows three CP routers, three virtual routers, and three service tunnels. For other embodiments of the invention any other number of CP routers, virtual routers, and service tunnels can be used. Moreover, more than one service tunnel can exist between two virtual routers.

Each of the service tunnels 30–32 facilities the tunneling of private IP packets across intervening network 12 in a way that is as transparent as possible to the customer premises routers and the applications running on those customer premises routers. Service tunnels 30–32 allow the formation of IP virtual private networks that offer services to subscribers at the CP routers 14–16. Service tunnel 30 allows the subscriber at customer premises router 14 to send private IP packets over network 12 and have them transported to customer premises router 15. Likewise, service tunnel 30 allows the subscriber at customer premises router 15 to send private IP packets to customer premises router 14. Service tunnel 31 allows the subscribers at CP routers 15 and 16 to exchange private IP packets. Service tunnel 32 allows the subscribers at CP routers 14 and 16 to exchange private IP packets. The private IP packets sent by CP routers 14–16 over service tunnels 30–32 can contain data, voice, and video. Each of the service tunnels 30–32 allows sessions to carry different payloads within the same service tunnel.

The L2TP tunnel described in the RFC 2661 document provides a standard method for tunneling point-to-point protocol ("PPP") packets. Service tunnels 30–32 are each a modified L2TP tunnel. The service tunnels 30–32 each include an extension to L2TP that provides a mechanism to support tunneling of additional payload types over individual sessions within an L2TP tunnel. These extensions provide added functionality that is optional and preserve backwards compatibility.

The service tunnels 30–32 each provide subscriber services (also called enterpriser services) to end users. The subscriber services include connectivity services, addressing services, reachability services, forwarding services, peering services, and premium services.

The connectivity services allow an end user to connect to all other sites within the subscriber's virtual private network. The connectivity services do not, however, allow an end user to connect to another subscriber's network.

Reachability services allow others within the same virtual private network to reach a particular end user. End users are able to advertise their respective addresses. Forwarding services allow an end user to decide how he or she would like to forward packets.

Premium services include policies on the priority of packets and the quality of services. Priority is also referred to as class of service ("CoS"). Class of service allows data to be tagged with a specific priority level with respect to the transport through service tunnels 30–32. For example, CP router 14 can assign a delivery priority to its outgoing private IP packets to be forwarded through service tunnel 30. This is important because during periods of congestion you do not want voice or video data sets to be dropped by switches or routers. A high priority assignment to these data sets ensures their delivery. Class of service enables "real-time" packets (for example, packets carrying full-motion video data) to be sent at a constant rate without interruption of delivery.

Data prioritization is only part of the equation, however. The delivery of time sensitive data also requires that sufficient bandwidth be available over service tunnels 30–32 and that transmission delays (i.e., latency) over service tunnels 30–32 be predictable and guaranteed. This is what quality of service is about. Quality of service ("QoS") refers to parameters associated with data prioritization that specify such things as the amount of bandwith a priority data transmission over service tunnels 30–32 requires as well as the maximum amount of latency the transmission can tolerate in order for the transmission to be meaningful. Quality of service is important for transmitting real-time voice and video traffic. For example, a video conferencing application might receive a high priority tag that requires a certain amount of bandwidth, a specific transmission rate, and maximum latency.

Addressing services relate to the use of private addresses over the service tunnels 30–32. The addressing services provided by service tunnels 30–32 include the hiding of the addressing scheme used by one enterprise from the general users of the public network 12. In other words, the addressing services provide security with respect to the addresses. The private IP packet addresses of the individual end users of the enterprise are hidden when the packets are transported over the service tunnels 30–32 over the network 12. The private IP addresses can be registered addresses, even though they remain hidden from others outside of the enterprise virtual private network.

The service tunnels 30–32 also provide security for the data transmitted by the private IP packets. The private IP packets can be encrypted so that they remain hidden from others outside of the enterprise virtual private network.

The peering services provided by the service tunnels 30–32 allow the sending of applications between clients, servers, and other computers within the enterprise over the service tunnels 30–32.

Each of the service tunnels 30–32 is established by two virtual routers communicating with each other. For example, service tunnel 30 is established by virtual router 21 establishing a service tunnel between virtual router 21 and virtual router 22.

Each of the service tunnels 30–32 is bidirectional, which means that private IP packets can be sent in each direction. Each of the service tunnels 30–32 is also symmetric.

When a service tunnel such as service tunnel 30 is set up, the end user specifies the Service Type. For the IP service tunnel that has been described herein, the Service Type is IP. For alternative embodiments, service tunnels are possible for other switching technologies, such as, ATM, TDM, or frame relay.

When a service tunnel is established, the service template is also specified. The service template refers to a class of service (i.e., priority), a quality of service, or other attributes, such as jitter requirements and the level of security. If, for example, high security is specified, then the data in the private IP packets would be encrypted.

Each of the service tunnels 30–32 may serve multiple subscribers or customers. In other words, for example, service tunnel 30 may serve enterprises A, B, and C concurrently. The virtual routers may also serve multiple customers. For example, virtual router 21 may serve enterprises A, B, and C. As another example, virtual router 22 may serve enterprises A, B, and D.

When a service tunnel is established, the end user indicates whether or not multiple enterprises will be using the specific service tunnel. For example, a particular enterprise may decide to pay a premium price to have a service tunnel, such as service tunnel 30, dedicated to that particular enterprise without sharing that service tunnel without any other enterprises. If an enterprise does not request that the service tunnel be dedicated to that particular enterprise exclusively, the service tunnel can serve multiple enterprises. Each of the service tunnels 30–32 supports multiple virtual private network sessions. An enterprise CP router, such as CP router 14, maps to the enterprise session within the tunnel.

Figure 3:
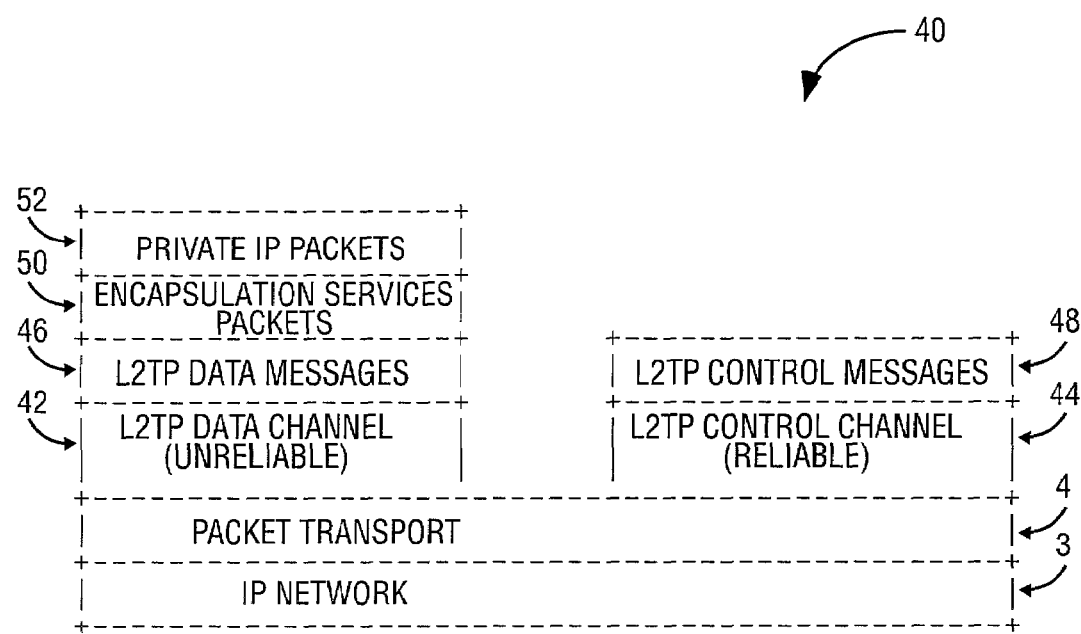
FIG. 3 shows the protocol structure of a service tunnel.

FIG. 3 illustrates the protocol structure for each of the service tunnels 30–32. Each service tunnel uses two types of messages—namely, control messages 48 and data messages 46. Control messages 48 are used in the establishment, maintenance, and clearing (i.e., tearing down) of tunnels and service tunnel sessions. Data messages 46 are used to encapsulate encapsulation services packets 50 and private IP packets 52 carried over the service tunnel. Encapsulation services packets 50 in turn encapsulate private IP packets 52. Each of the service tunnels 30–32 is a modified L2TP tunnel, so the control messages 48 are modified L2TP control messages and the data messages 46 are modified L2TP data messages.

Control messages 48 use a reliable control channel 44 within L2TP to guarantee delivery. The fact that the control channel 44 is reliable means that the control channel 44 utilizes an acknowledgment mechanism.

The data messages 46 use an unreliable data channel 42 within L2TP for delivery. The fact that the data channel 42 is unreliable means that there is no acknowledgment of the receipt of data from the receiving node to the sending node. Data messages 46 are not retransmitted when packet loss occurs.

Private IP packets 52 are passed over L2TP data channel 42 encapsulated in encapsulated services packets 50, further encapsulated in L2TP data messages 46 (within L2TP header), and yet further encapsulated in packet transport layer 4, such as UDP. For an alternative embodiment, packet transport layer 4 is TCP. Control messages 48 are sent over L2TP control channel 44 that transmits packets in-band over the same packet transport layer 4. The packet transport layer 4 overlays the IP network 3. Thus, the information in the packet transport layer 4 is in turn sent over the internet protocol layer 3.

Sequence numbers are required to be present in all control messages 48 and are used to provide reliable delivery on the control channel 44. Data messages 46 may use sequence numbers to reuse packets and detect lost packets.

All values are placed into their respective fields and sent in network order, which is high order octets first.

Figure 4:
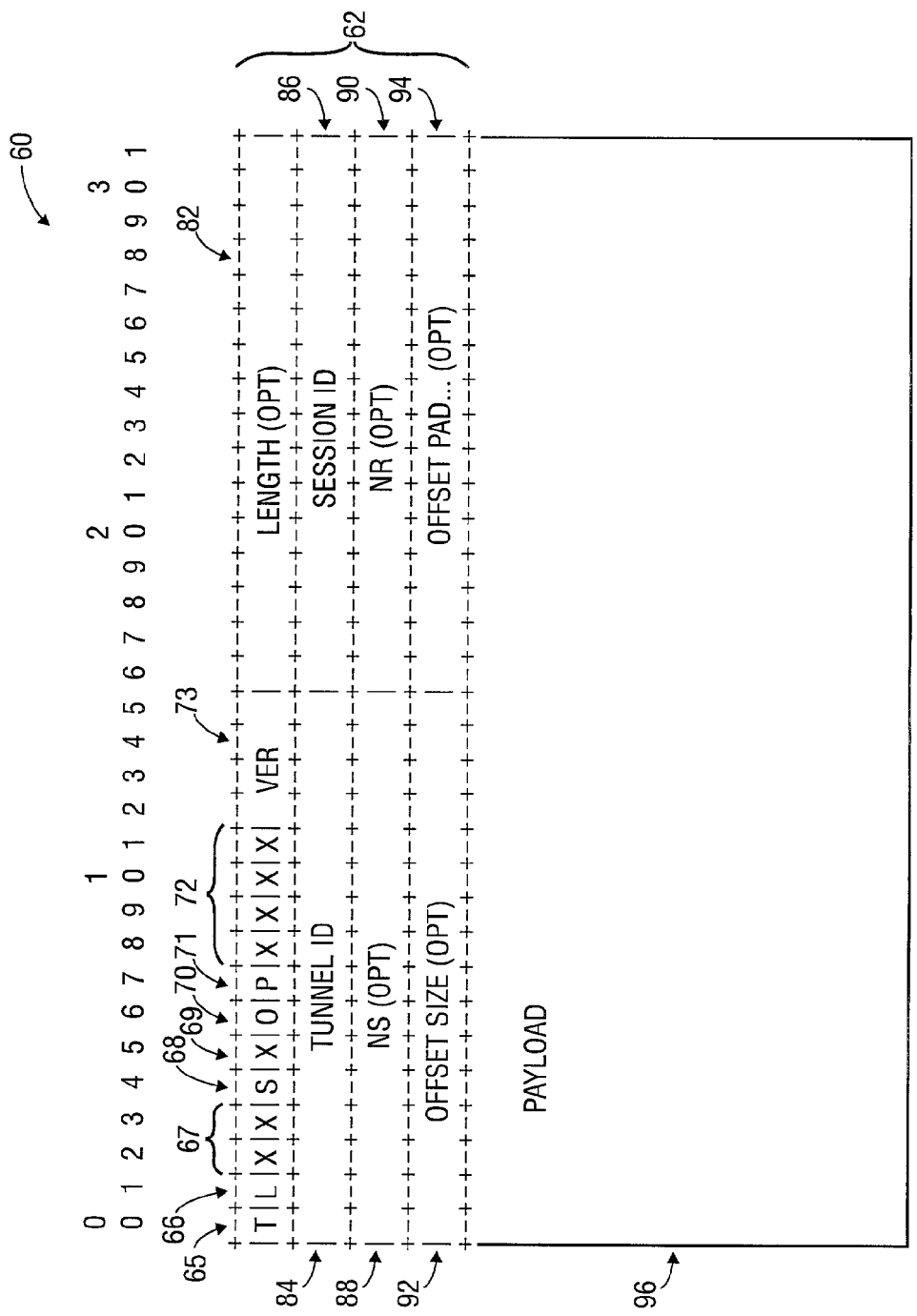
FIG. 4 shows a service tunnel packet, including the L2TP message header.

FIG. 4 illustrates the service tunnel L2TP packet 60, which includes an L2TP header 62 and a payload portion 96.

The payload 96 contains either control messages 38 or data messages 46. The data messages 46 in turn contain encapsulation services packets 50 and private IP packets 52. The service tunnel L2TP packets 60 for the control channel 44 and the data channel 42 share a common header format 62.

The fields of header 62 are as follows.

The Type ("T") bit 65 of L2TP header 62 indicates the type of message. Bit 65 is set to zero for a data message 46 and set to one for a control message 48. If the Length ("L") bit 66 is set to one, the Length Field 82 is present. The bit 66 must be set to the number one for control messages 48. The X bits 67, 69, and 72 are reserved for future extensions. If the Sequence ("S") bit 68 is set to one, then the Ns field 88 and the Nr field 90 are present. The S bit 68 must be set to one for control messages 48. If the Offset ("O") bit 70 is set to one, then the Offset Size Field 92 is present. The Offset bit 70 must be set to zero for control messages 48. If the Priority ("P") bit 71 is set to one, then the data message 46 should receive preferential treatment in its local queuing and transmission. This feature is used only with data messages 46. The P bit 71 must be set to zero for all control message 48. The Version ("Ver") field 73 indicates the version of the L2TP message header 62.

The Length field 82 indicates the total length of the message 60 in octets. The Length field is optional for data messages 46 but not for control messages 48.

The Tunnel I.D. field 84 indicates the identifier for the control connection for the establishment of the service tunnel. The Session I.D. field 86 indicates the identifier for a session within a service tunnel.

The Ns field 88 indicates the sequence number for a data message 46 or a control message 48. The Ns field 88 is optional for data messages 46, but not for control messages 48.

The Nr field 90 indicates the sequence number expected in the next control message 48 to be received. The Nr field 90 is optional for data messages 46, but not for control messages 48.

The Offset Size field 92, specifies the number of octets past the L2TP header 62 at which the payload data 96 is expected to start. The Offset Size field 92 is optional. Actual data within the Offset Padding field 94 is undefined. The Offset Padding field 94 is optional. If the Offset Padding field 94 is present, the L2TP header 62 ends after the last octet of the Offset Padding 94.

For a field of header 62 that is indicated as optional for some or all messages. The space for that field does not exist in the message if the field is masked as not present.

Figure 5:
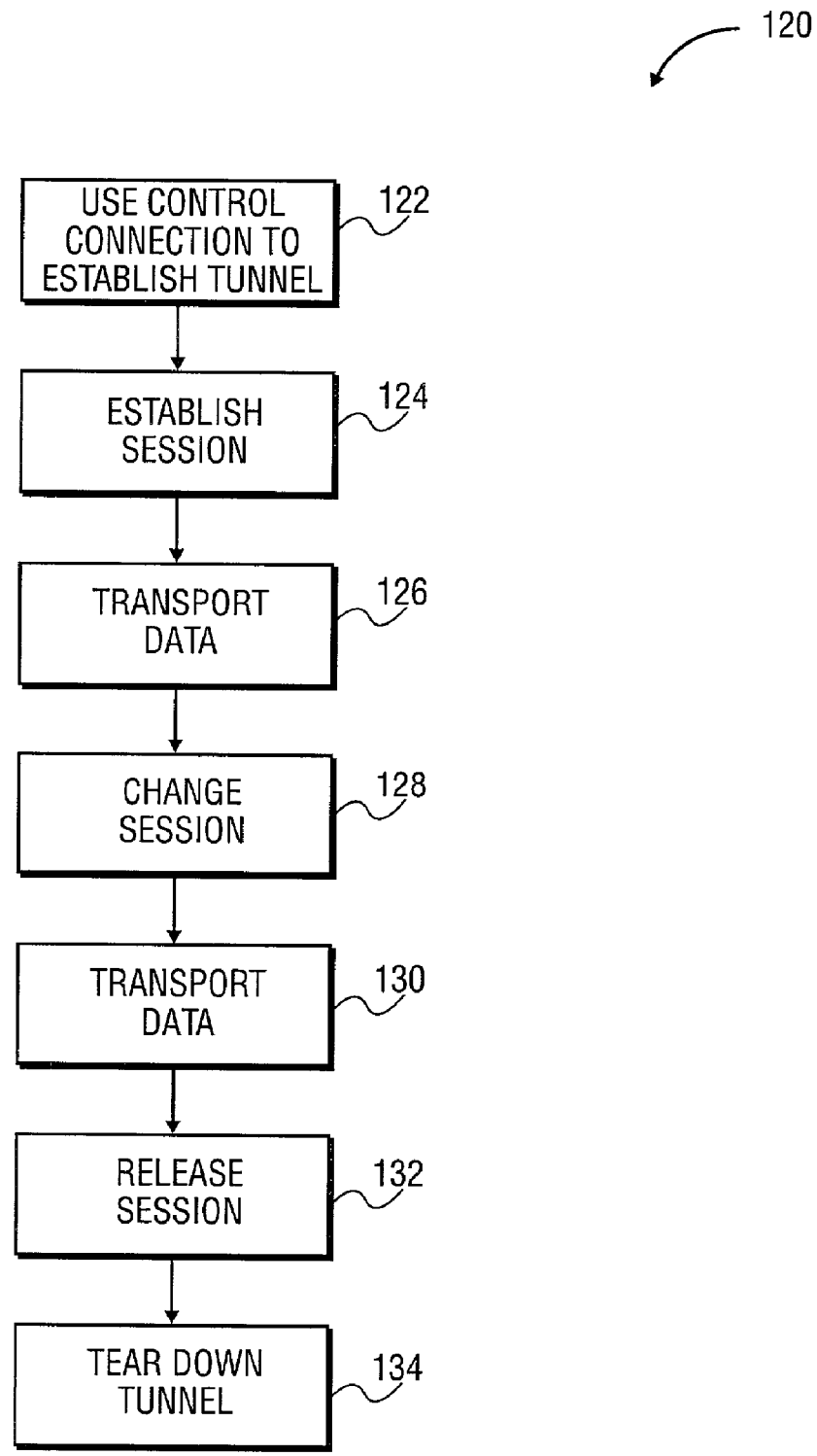
FIG. 5 shows the process for setting up and tearing down a service tunnel.

FIG. 5 illustrates the procedures 120 associated with the establishment of a service tunnel, the use of a service tunnel, and the tearing down of the service tunnel. At process block 122, a control connection is used to establish the service tunnel, such as service tunnel 30. Moving to process block 124, an individual session is established within the service tunnel 30. The service tunnel 30 supports multiple sessions.

At process block 126, data is transported over the service tunnel 30. The data comprises data messages 46 that encapsulate encapsulation services packets 50 and private IP packets 52.

At process block 128, a change is made with respect to the service tunnel session. Process flow then moves to process block 130. At process block 130, data messages 46 that encapsulate encapsulation services packets 50 and private IP packets 52 are transported during the changed session of the service tunnel 30.

Process flow then moves to process block 132, at which point the session is released. At process block 132, the service tunnel still exists, but the session within the service ends.

Moving to process block 134, the tunnel is then torn down.

Figure 6:
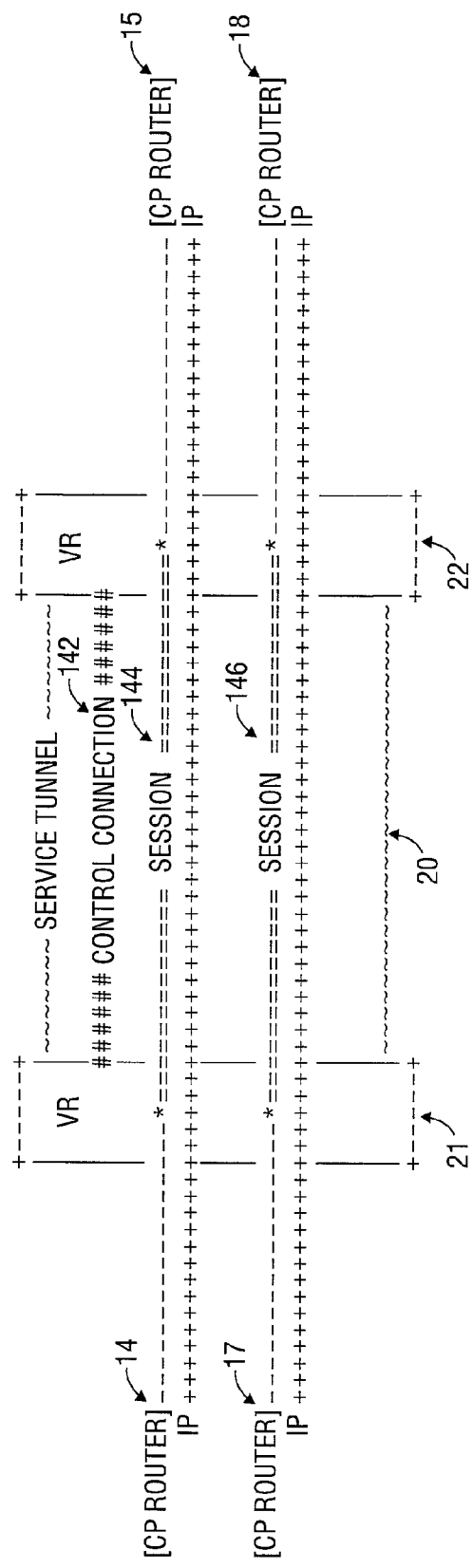
FIG. 6 illustrates the establishment of a service tunnel.

FIG. 6 illustrates the establishment of service tunnel 30 between virtual router 21 and virtual router 22. Establishing service tunnel 30 comprises two main steps. The first step is the establishment of the control connection 142 for the service tunnel 30. The control connection 142 is established between virtual router 21 and virtual router 22. The second main step is the establishment of the session 144 as triggered by a request from one the CP routers, such as CP router 14. The service tunnel 30 and the corresponding control connection 142 must be established before any transport of data over the session 144 is initiated.

Multiple service tunnel sessions may exist across a single service tunnel. For example, as shown in FIG. 6, service tunnel 30 includes both session 144 and session 146. Session 144 is between end users at CP routers 14 and 15. Session 146 is between CP routers 17 and 19, which are part of a different enterprise than CP router 14 and 15.

Furthermore, multiple service tunnels may exist between the same virtual routers. For example, there can exist multiple service tunnels between virtual router 21 and virtual router 22, instead of just service tunnel 30.

Control messages 48 (see FIG. 2) are used in the establishment maintenance, and tearing down of service tunnels, such as service tunnels 30–32. To maximize extensibility while still permitting interoperability, a uniform method for encoding control Message Types and bodies is used throughout L2TP. This encoding is called Attribute Value pair (AVP). An Attribute Value pair is defined as the variable length concatenation of unique attribute (represented by an integer) and a value containing the actual value identified by the attribute.

Figure 7:
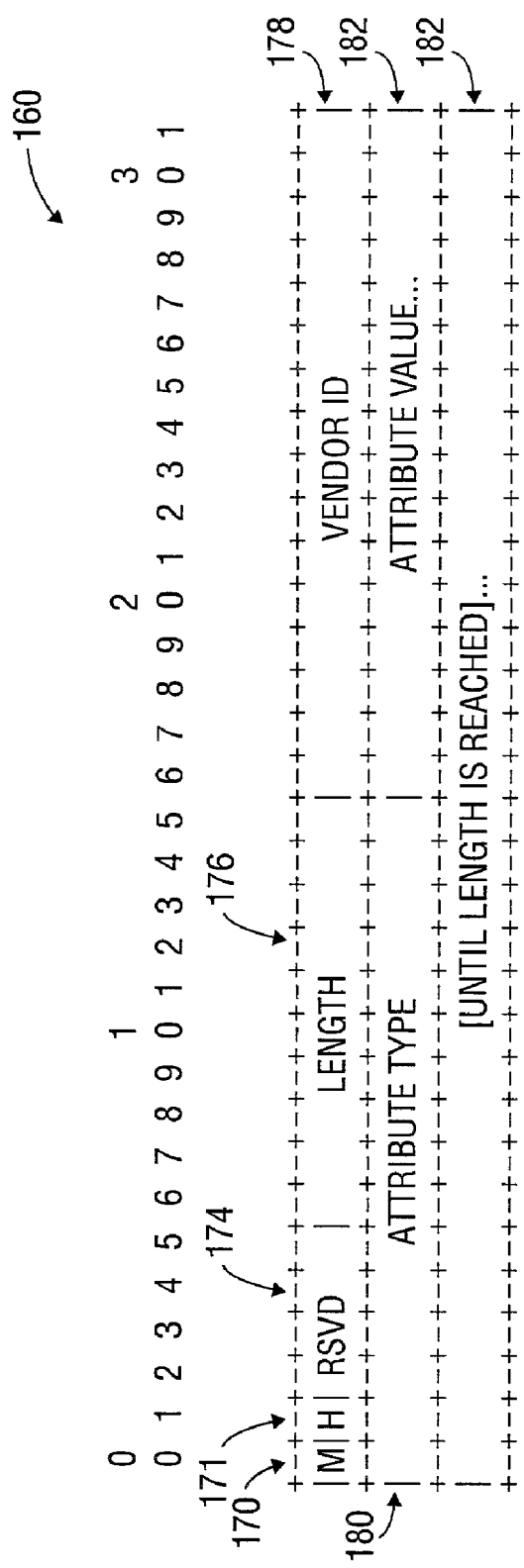
FIG. 7 shows the format of an Attribute Value pair ("AVP") for the service tunnel.

FIG. 7 shows the Attribute Value pair format 160. The format 160 is used for the encoding of each attributes value pair. The fields 170, 171 and 174 together comprise a bit mask describing the general attributes of the AVP 160. The reserved bits of field 174 are set to zero. The Mandatory ("M") bit 170 controls the behavior required of an implementation that receives an AVP that it does not recognize. The Hidden ("H") bit 171 identifies the hiding of data in the Attribute Value field 182 of the AVP 160.

The Length field 170 encodes the number of octets (including the overall length and bit mask fields) contained in the AVP 160. Field 178 is the Vendor ID field that identifies the particular L2TP extension.

The Attribute Type field 180 is a two octet value with a unique interpretation across all AVPs defined under a given Vendor ID 178.

The Attribute Value field 182 is the actual value as indicated by the Vendor ID 178 and the Attribute Type 180. The Attribute Value field 182 follows immediately after the Attribute Type field 180 and thus runs for the remaining octets indicated in the Length field 176 (i.e., the Length field 176 minus six octets of header). The minimum length of an AVP 160 is six octets. If the length of the AVP 160 is six octets, then the Attribute Value field 182 is absent.

Control message AVPs are used to establish the control connection 142 shown in FIG. 6. The control connection 142 is the initial connection that must be achieved between the virtual router 21 and the virtual router 22 before sessions, such as sessions 144 and 146, may be brought up. Establishment of the control connection 142 includes securing the identity of the peer, as well as identifying the peers L2TP version, framing, and bearer capabilities etc. Establishment of the control connection 142 is also indicated by process block 122 in FIG. 5.

A three message exchange is used to setup the control connection 142 of FIG. 6. The following is a typical message exchange. The virtual router 21 sends the Start Control Connection Request ("SCCRQ") control message. The virtual router 22 responds with a Start Control Connection Reply ("SCCRP") control message. The virtual router 21 then sends a Start Control Connection Connected ("SC-CCN") control message.

The virtual router 22 then responds with a Zero Length Body ("ZLB") Acknowledgement message. A zero length body message is a control packet with only an L2TP header 62. ZLB messages are used for explicitly acknowledging packets on the reliable control channel 44. The ZLB Acknowledgement message is sent if there are no further messages waiting in queue for that peer.

The Start Control Connection Request control message is thus used to initialize service tunnel 30. The following AVPs must be present in the Start Control Connection Request Control message: (1) Message Type AVP, (2) Service Type AVP 200 (described below), (3) Protocol Version, (4) Host Name, (5) Framing Capabilities, and (6) Assigned Tunnel ID.

Figure 8:
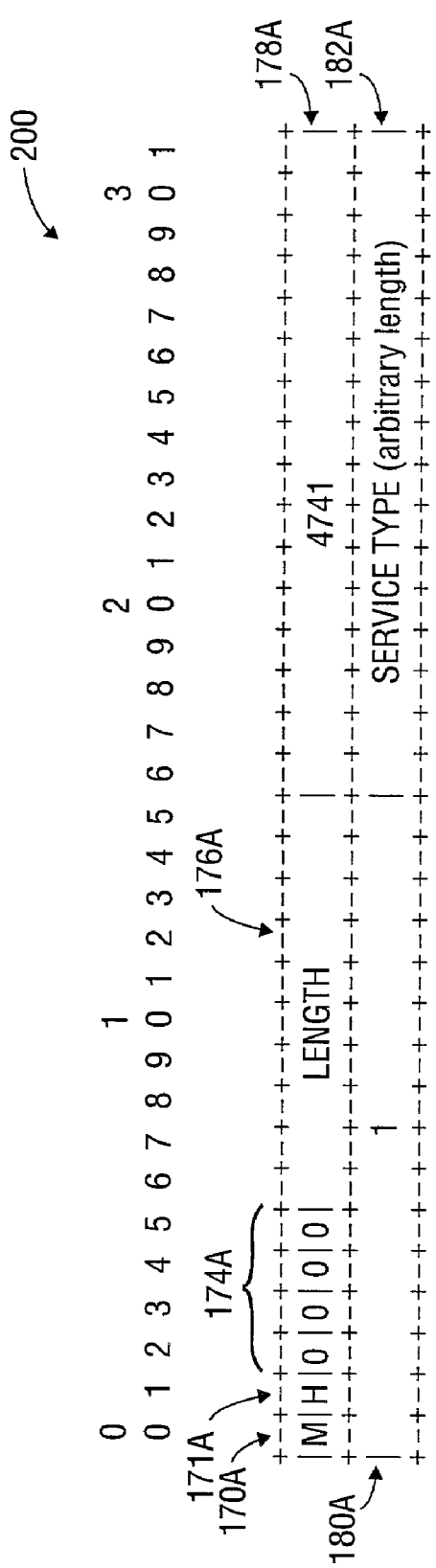
FIG. 8 shows a Service Type List AVP for the service tunnel.

FIG. 8 illustrates the format of Service Type AVP 200 that is used for indicating which payload types are supported on sessions of the service tunnel 30. In other words, Service Type AVP 200 indicates what types of payloads can be carried by payload 96 of data message 46.

For Service Type AVP 200, the length of the AVP is indicated in Length field 176A. The Vendor ID field 178a has an ID number of 4741. Alternatively, the vendor ID field 178a can contain the number zero and an attribute value chosen. The Attribute Type field 180a contains the 16 bit quantity "1."

The Attribute Value field 182a indicates one of the service types. The service types can be the types of payloads that can be carried by data messages 46. The types of payloads that can be specified include private IP packets 52, encapsulation service packets 50, PPP frames, ATM cells, frame relay frames, and TDM data, for example. The enterprise using the service tunnel 30 enters into a service contract with a service provider that specifies the particular payload types supported for that enterprise by the service tunnel 30. For example, for one embodiment, service type zero could specify private IP packets 52 and service type A could specify PPP. Service type B could specify ATM cells. The service type specified in Attribute Value field 182a can also indicate the type of connectivity services, reachability services, forwarding services, premium services (such as class of service and quality of service), addressing services, and peering services supported by service tunnel 30 for the particular subscriber or enterprise. The service type specified in Attribute Value field 182a can also be of various (arbitrary) lengths. Moreover, depending upon the terms of the service contract entered into by the enterprise, more than one service type at a time can be specified in Attribute Value field 182a. Thus, the service tunnel can handle more than one service type at a time.

The Service Type AVP 200 is an indication by an L2TP peer, such as virtual router 21, that resources adequate for the service type identified by the Service Type AVP 200 are required. In the event that the L2TP peer, such as virtual router 22, does not accept the requested service type, then a StopCCN message is returned to the orginator. The StopCCN message should include the Service Type AVP 200 as provided in the message that caused the StopCCN The Service Type AVP 200 may be hidden (i.e., the H bit 171a may be zero or one). The Length (before hiding) of the Service Type AVP 200 is six octets plus the length of the Service Type string of field 182a.

The service tunnels 30–32 provide the mechanisms for protocol data units ("PDUs") other than PPP to be tunneled via L2TP. In order to facilitate this in a backwards compatible manner, the M bit 170a should not be set on the Service Type AVP 200 unless the PPP tunneling protocol specified in document RFC 2261 is not supported. Thus, if RFC 2261 PPP tunneling is not supported by a particular implementation, the M bit 170a should be set to a logic one value on the Service Type AVP 200 in order to ensure that an implementation unaware of the Service Types other than PPP and/or requiring a Service Type PPP tunneling would disallow establishment of the L2TP tunnel.

Returning to the discussion of control messages used to establish the Control Connection 142 of FIG. 6, the Start Control Connection Reply ("SCCRP") control message is sent in reply to a received SCCRQ message. The following AVPs must be present in the SCCRP: (1) Message Type, (2) Service Type AVP 200, (3) Protocol Version, (4) Framing Capabilities, (5) Host Name, and (6) Assigned Tunnel ID.

The Start Control Connection Connected (SCCN) control message is sent in reply to the SCCRP. The SCCCN control message completes the tunnel establishment process. The SCCN control message must include a Message Type AVP.

After the control connection 142 is established, the virtual routers 21 and 22 can optionally send messages to authenticate the formation of the service tunnel 30 shown in FIG. 6.

After a successful control connection 142 establishment, individual sessions may be created, which is indicated by process block 124 of FIG. 5. Each session, such as session 144 shown in FIG. 6, corresponds to a single stream of data messages 46 between virtual router 21 and virtual router 22. If private IP packets 50 are specified as the Service Type, then the data messages 46 would carry private IP packets 52 and encapsulation services packets 50 during the sessions. Unlike control connection 142 establishment, session establishment is directional with respect to the virtual router 21 and virtual router 22. The virtual router 21 requests the virtual router 22 to accept a session for private IP packets 52 from CP router 14. The virtual router 22 requests the virtual router 21 to accept a session for private IP packets 52 from CP router 15.

A three message exchange is employed to setup a session involving private IP packets 52 incoming from GP router 14. The following is a typical sequence of events. The virtual router 21 detects that CP router 14 wishes to send an incoming stream of private IP packets 52. Virtual router 21 sends an Incoming Call Request ("ICRQ") control message to virtual router 22. Virtual router 22 responds by sending to virtual router 21 an Incoming Call Reply ("ICRP") control message. The virtual router 21 responds by sending an Incoming Call Connected ("ICCN") control message to virtual router 22. A Zero Length Body Acknowledge message is sent from virtual router 22 to virtual router 21 if there are no further messages waiting in the queue for that peer.

For establishing a session involving the outgoing transport of private IP packets 52 from CP router 15 to CP router 14 over session 144, a three message exchange is employed to setup the session. The following is a typical sequence of events. The virtual router 22 sends an Outgoing Call Request ("OCRO") control message to virtual router 21. Virtual router 21 then replies with an Outgoing Call Reply ("OCRP") control message that virtual router 21 sends to virtual router 22.

Once the private IP packets 52 are able to be transported and a connection through session 144 has been obtained, then the virtual router 21 sends an Outgoing Call Connected ("OCCN") control message to virtual router 22. Virtual router 22 then sends a Zero Length Body Acknowledgement message to virtual router 21 if there are no further messages waiting in queue for that peer.

The Incoming Call Request message is used to indicate that session 144 is to be established between virtual router 21 and virtual router 22 for the incoming private IP packets 52 and provides the virtual router 22 with parameter information for the session 144. The virtual router 21 may defer establishing the session 144 until virtual router 21 has received an Incoming Call Reply control message from virtual router 22 indicating that the session should be established. This mechanism allows the virtual router 22 to obtain sufficient information about the incoming IP packets 52 before determining whether the session 144 should be established or not.

The following AVPs must be present in the Incoming Call Request message: (1) Message Type, (2) Sub-Address AVP 220 (described below), (3) Assigned Session ID, and (4) Call Serial Number.

Figure 9:
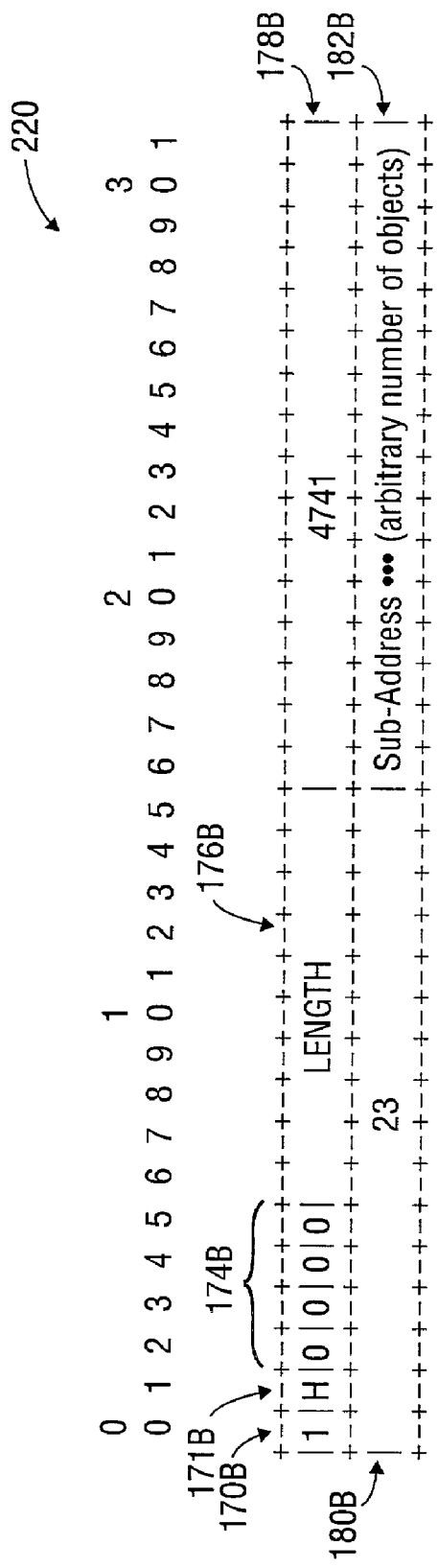
FIG. 9 shows a Sub-Address AVP for the service tunnel.

The format of the Sub-Address AVP 220 is shown in FIG. 9. The Service Type AVP 220 encodes additional connection identifier information for the incoming or outgoing sending of data messages 46. The Sub-Address AVP 220 must be located immediately following the Message Type AVP, unless it is hidden, in which case the Random Vector AVP will precede it.

The M bit 170b for the Sub-Address AVP 220 should be set to one. The Sub-Address AVP 220 may be hidden, so the H bit 171b may be a zero or a one. The Length (before hiding) of the Sub-Address AVP 220 is six octets plus the length of the Sub-Address in field 182b, and the total length is placed in Length field 176b.

For the Service Type AVP 220, the Vendor ID field 178b contains the number 4741. For an alternative embodiment, the Vendor ID 1786 is zero and an attribute value is chosen. The Attribute Type field 180b contains the 16-bit quantity 23.

The Attribute Value field 182b of the Sub-Address AVP 220 contains sub-addresses of various (arbitrary) lengths. The sub-addresses stored in Attribute Value field 182b comprise an opaque sequence of octets transmitted transparently by the network 11. The service tunnel 30 endpoints, such as virtual routers 21 and 22, must understand the meaning of the values stored in Attribute Value field 182b for encapsulation services in this Sub-Address AVP. The sub-addresses stored in Attribute Value field 182b can include the calling party sub-address and the called party sub-address.

If virtual router 21 or virtual router 22 requires the use of the Sub-Address AVP 220 for every session and that router receives a Service Type AVP 200 without the M bit 170a set to zero, then the service tunnel 30 must be torn down.

Returning to FIG. 6, the Incoming Call Reply control message is used to indicate that the Incoming Call Request control message was successful and for the virtual router 21 to communicate with the CP router 14 that the virtual router 21 is ready to accept private IP packets 50 if the virtual router 21 has not already done so. The Incoming Call Reply control message also allows the virtual router 22 to indicate the necessary parameters for the session 144. The following AVPs must be present in the Incoming Call Reply control message: (1) Message Type and (2) Assigned Session ID.

The Incoming Call Connected control message is used to indicate that the Incoming Call Reply control message was accepted, that the virtual router 21 has established communication with the CP router 14, and that the session 144 should move to the established state. It also provides additional information to the virtual router 22 about parameters used for the communication between virtual router 21 and CP router 14. The following AVPs must be present in the Incoming Call Connected control message: (1) Message Type, (2) Transmission Connect Speed, and (3) Framing Type.

The Outgoing Call Request control message is used to indicate that a session 144 is to be established between the virtual routers 21 and 22 and provides the virtual router 21 with parameter information for both the session 144 and for the private IP packets 52 that are to be sent during the session.

The virtual router 22 must have received a Bearer Capabilities AVP during service tunnel establishment from the virtual router 21 in order to request the sending of private IP packets 52 to the virtual router 21.

The following AVPs must be present in the Outgoing Call Request control message: (1) Message Type, (2) Sub-Address AVP 220, (3) Assigned Session ID, (4) Call Serial Number, (5) Minimum BPS, (6) Maximum BPS, (7) Bearer Type, (8) Framing Type, and (9) Called Number.

The Outgoing Call Reply control message is used to indicate that the virtual router 21 is able to attempt the outbound sending of private IP packets 52 and returns certain parameters regarding the attempt to send private IP packets 52. The following AVPs must be present in the Outgoing Call Reply control message: (1) Message Type and (2) Assigned Session ID.

The Outgoing Call Connected control message is used to indicate that the result of a requested sending of private IP packets 52 was successful. The Outgoing Call Connected control message also provides information to the virtual router 22 about the particular parameters obtained after the sending of the private IP packets 52 was established. The following AVPs must be present in the Outgoing Call Connected control message: (1) Message Type, (2) Transmission Connect Speed, and (3) Framing Type.

Once the session 144 has been established, then the encapsulation services packets 50 and private IP packets 52 are transported over the service tunnel 30, which is indicated by process block 126 in FIG. 5. With reference to FIGS. 3 and 6, the private IP packets 52 are received by virtual router 21 from CP router 14. Virtual router 21 places the private IP packets 52 into the payload portions of encapsulation services packets 50. Virtual router 21 also places the encapsulation services packets 50 (that encapsulate private IP packets 52) into the payload portions 96 of service tunnel L2TP packets 60 to form data messages 46. The virtual router 21 then forwards the data messages 46 (with their encapsulated private IP packets 52 and encapsulated services packets 50) over session 144 and service tunnel 30. The virtual router 22 receives the data messages 46 and extracts the encapsulated services packets 50 and private IP packets 52. The virtual router 22 processes the encapsulated services packets 50 and private IP packets 52 as if they were received on a private IP packet network. The private IP packets 52 are then forwarded by virtual router 22 to CP router 15.

The sender of a message associated with a particular session and service tunnel places the Session ID and Tunnel ID (specified by its peer) in the respective Session ID field 86 and Tunnel ID field 84 of the L2TP headers 62 of data messages 46 for all data messages 46. In this manner, private IP packets 52 are multiplexed and demultiplexed over a single service tunnel between a given pair of virtual routers, such as virtual router 21 and virtual router 22. Multiple service tunnels may exist between a given pair of virtual routers. In addition, multiple sessions may exist within a service tunnel.

Figure 10:
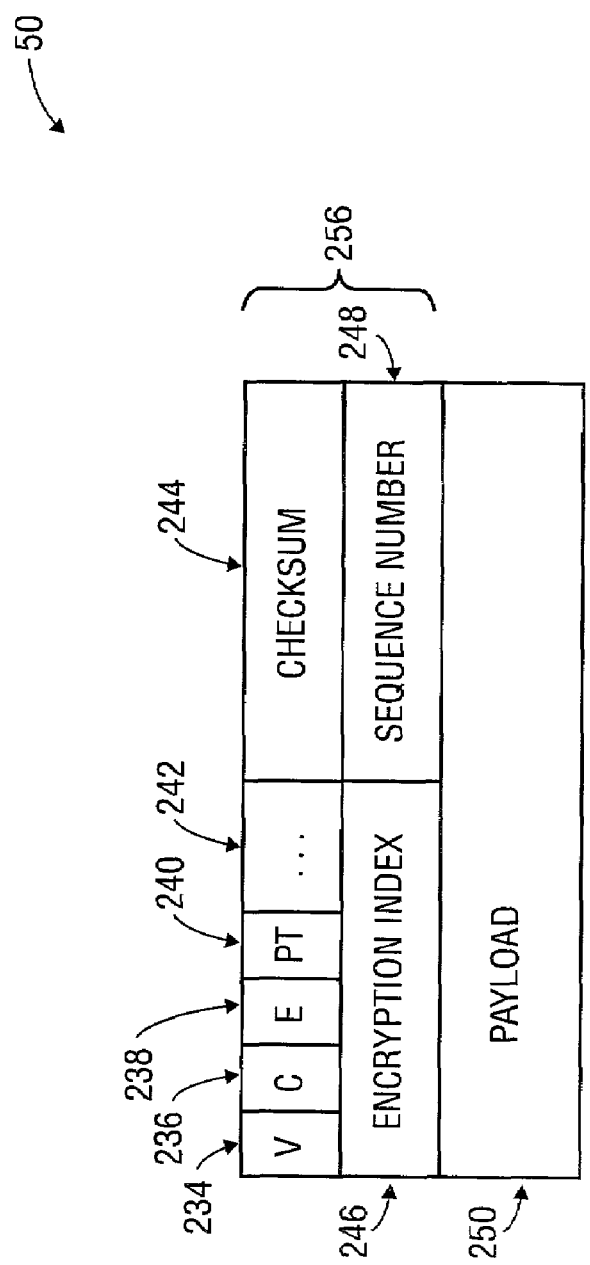
FIG. 10 shows an encapsulation services packet for the service tunnel.

FIG. 10 illustrates encapsulation services ("ES") packet 50 in more detail. Encapsulation services packet 50 includes an encapsulation services header 256 and a payload 250. The encapsulation services header 256 is also referred to as the services tunnel header 256 or the in-band header 256.

Figure 11:
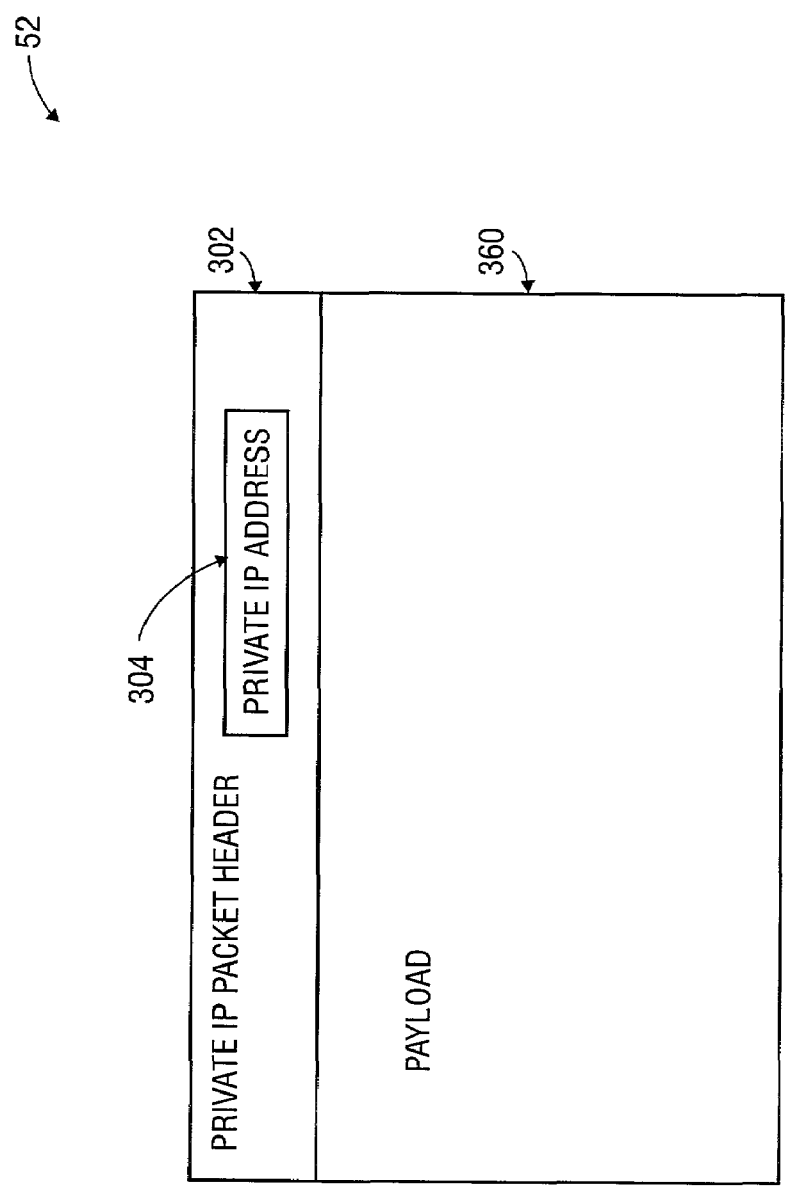
FIG. 11 shows a private IP packet.

A private IP packet 52 shown in FIGS. 3 and 11 is placed by virtual router 21 in the payload portion 250 of encapsulation services packet 50 shown in FIG. 3 and 10. The encapsulation services packet 50 is in turn placed by virtual router 21 in the payload portion 96 of L2TP packet 60 to form data message 46. Thus, data message 46 encapsulates encapsulation services packet 50, which in turn encapsulates private IP packet 52.

The encapsulation services header of 256 of ES packet 50 shown in FIG. 10 includes a Version Number field 234. The Version Number of the private IP packet 52 (that is encapsulated as payload 250) is inserted in field 234 in order to ensure forward compatibility.

The field 236 of ES header 256 indicates the type of compression used by the private IP packet 52 stored in payload 250. Both sides of service tunnel 30 can negotiate for a compression scheme. Thus, virtual router 21 and virtual router 22 can negotiate for the compression scheme to be used for private IP packet 52 stored in payload 250. Once a compression scheme has been negotiated and agreed to, then virtual router 21 can compress the private IP packets 52 according to that scheme. The field 236 would indicate the type of compression used for the private IP packets 52. The virtual router 22 at the egress side would then decompress the private IP packets 52 using the compression field 236 for guidance as how to decompress the private IP packets 52.

The field 238 of encapsulation services header 256 indicates whether the private IP packet 52 stored in payload 250 is encrypted. Both sides of service tunnel 30 negotiate for an encryption scheme when a session, such as session 144, is established. Thus CP router 14 and CP router 15 negotiate for an encryption scheme for service tunnel 30. Once the CP routers 14 and 15 have agreed upon encryption and the type of encryption, then the virtual router 21 at the egress side of the service tunnel 30 will encrypt the private IP packet 52 in payload 250 according to the encryption scheme.

Field 246 of ES header 256 contains an Encryption Index. The Encryption Index 246 points to which encryption key is used. If the private IP packets 52 in payload 250 are encrypted, the virtual router 22 at the egress side uses the key pointed to by the encryption index 246 to de-encrypt the private IP packet 52 in payload 250.

The field 240 of the encapulation services header 256 indicates the payload type stored in payload 250. The payload type that is indicated by the value stored in field 240 can either be a control payload or a data payload. Control payloads stored in payload 250 are used for session negotiation and management with respect to the service tunnel 30. The data payload stored in payload 250 is private IP packet 52, which in turn stores customer data being transported over service tunnel 30.

A checksum value is stored in field 244 of encapsulation services header 256 for the purposes of error detection and correction with respect to ES packet 50, including payload 250. A checksum is a parameter used to detect errors. Checksums are calculated using a predetermined generator polynomial assigned to the specific checksum field 244. The checksum 244 is included in header 256 to help to ensure that the header 256 will be detected once the ES packet 50 is transported.

Field 248 of encapsulation services header 256 stores a sequence number with respect to the ES packet 50. The sequence number stored in field 248 indicates where this particular ES packet 50 fits within the sequence of ES packets over service tunnel 30. The use of sequence numbers in field 248 for ES packets 50 is optional. The sequence number stored in field 248 can be used for security purposes to keep hackers from replaying ES packets 50. Therefore, the sequence number in field 248 is typically used in conjunction with encryption to increase security. In addition, a sequence number can be stored in field 248 for control payload types involving session negotiation and management.

Payloads stored in payload field 250 of private IP packet 50 will in turn typically have their own headers and payloads. FIG. 11 shows private IP packet 52 that includes a header 302 and a payload 360. The header 302 includes a private IP address 304 used for the transport of the private IP packet 52. The private IP address 304 is also referred to as the inner IP address 304. CP router 14 sending data messages 46 over service tunnel 30 would encapsulate private IP packet 52 in ES packet 50, which in turn would be encapsulated in data message 46. The private IP packet 52 would include an inner IP address 304 that CP router 14 wants to send to CP router 15 for CP router 15's use.

The following example of how inner IP addresses (such as those stored at private IP address field 304) are handled by the service tunnels is made with reference to FIG. 2. Virtual routers 21, 22, and 23 advertise which virtual private networks they handle and which inner IP addresses on those virtual private networks they handle. For example, virtual routers 21, 22, and 23 would advertise to each other that they manage virtual private network A and the inner IP addresses associated with the virtual private network A. If CP router 14 wishes to send a data packet to inner IP address 168, CP router 14 sends the private IP packet 52 to virtual router 21. Virtual router 21 realizes that this inner IP address 168 is associated with virtual private network A and then decides how virtual router 21 can reach this inner IP address 168 and virtual private network A. Virtual router 21 has received advertisements from virtual routers 22 and virtual routers 23 regarding the inner IP addresses they can reach. Therefore, virtual router 21 has in a lookup table (i.e., forwarding table) the information regarding the inner IP addresses and how to reach them. Virtual router 21 uses the forwarding table to determine that inner IP address 168 can be reached through virtual router 23. Virtual router 21 then looks up to see which service tunnel can be used to get to virtual router 23. Virtual router 21 also decides which session needs to be used within the service tunnel to get to virtual router 23 to reach the inner IP address of 168. For example, the virtual router 21 determines that service tunnel 32 should be used to get to virtual router 23 and that Session ID 446 within service tunnel 32 should be used to get to virtual router 23 for inner IP address 168.

Virtual router 21 then encapsulates the private data IP packets 52 of CP router 14 within ES packets 50, which CP router 21 in turn encapsulates within the service tunnel L2TP packets 60, which become the data messages 46. The virtual router 21 sets the Tunnel ID 84 within L2TP header 62 to indicate service tunnel 32. The virtual router 21 also inserts Session ID 446 of L2TP header 62. Virtual router 21 then sends the data messages 46 over service tunnel 32 and session 446 to virtual router 23. The payload 250 of each ES packet 50 is compressed or encrypted according to the encapsulation services header 256.

The virtual router 23 receives the service tunnel data messages 46 with their data stored in payload portion 96. Virtual router 23 looks at the Tunnel ID in field 84, which is service tunnel 32, and the Session ID in the field 86, which is Session ID 446, and maps the payload 96 onto virtual private network A. The virtual router 23 then de-encapsulates (i.e., extracts) the payload 96 into private IP data packets 52 having an inner IP address 168 and sends those private IP data packets 52 to CP router 16. CP router 16 uses the inner IP address 168 to look up in its router table where to send the data packets 52. The customer or subscriber at inner IP address 168 then receives the data packets 52 from CP router 16.

Returning to FIG. 5, once a session has been established, process block 124, the session (such as session 144) can be changed at process block 128. An example of a session change would be changing a session from sending voice information to fax information. If service tunnel 30 has been established and session 144 within service tunnel 30 has been established, as shown in FIG. 3, CP router 14 may decide to stop sending voice information over session 144 and instead wish to send fax information over session 144. The end user at CP router 14 would notify the service provider responsible for maintaining service tunnel 30 of his or her wish to change from a voice session to a fax session. This could be done either manually through a telephone call or by sending an appropriate control message. The service provider would send a message to virtual router 21 to change the type of session from a voice session to a fax session. Virtual router 21 would then send the appropriate control message to virtual control router 22 to ensure that the session is changed from a voice session to a fax session. The change in the character of the session 144 would be done without tearing down the session 144 or tearing down the service tunnel 30.

Another example of a change of a session within service tunnel 30, such as session 144, would be a change in addressing. For example, one of the inner IP addresses within a virtual private network might be withdrawn. An employee of an enterprise may leave and his or her inner IP address may be deleted. The service provider would accordingly send an appropriate protocol message to virtual router 21 to change the routing tables. Virtual router 21 would in turn send appropriate messages to the other virtual routers 22 and 23 to have their routing tables changed with respect to the inner IP addresses available on the particular virtual private network. Again, this would be done without tearing down the session or tearing down the tunnel. Instead, there would simply be a change with respect to the session 144 established.

Changes done with respect to sessions without tearing down the session or tearing down the tunnel are conducted through in-band signaling because they use encapsulated messages or relate to encapsulated messages. In-band signaling can be used to handle service provisioning. Service provisioning has two parts. The first part is the order entry. In other words, an end user or subscriber wishes to change the type of service and submits an order entry to the service provider. The second part of provisioning is the change of the Service Type. In other words, the type of session is changed.

Process block 132 shown in FIG. 5 refers to releasing a session, such as session 144, which is also referred to as session teardown. Session teardown may be initiated by either the virtual router 21 or virtual router 22 and is accomplished by sending a Call Disconnect Notify ("CDN") message. The following is an example of a typical control message exchange between virtual 21 and virtual router 22. Virtual router 21 sends a Call Disconnect Notify control message to virtual router 22. Virtual router 22 responds and sends a Zero Length Body Acknowledge message to virtual router 21.

The purpose of the Call Disconnect Notify message is to inform the peer of the disconnection and the reason why the disconnection occurred. The peer must clean up any resources, and does not send back any indication of success or failure of such cleanup. The follow AVPs must be present in the Call Disconnect Notify call message: (1) Message Type, (2) Result Code, and (3) Assigned Session ID.

After the last session within service tunnel 30 is cleared, the control connection 142 may be torn down as well and typically is. Control connection teardown is indicated by process block 134 in FIG. 5. Process block 134 refers to tearing down the tunnel. Tearing down the control connection 142 tears down the service tunnel 30.

Control connection 142 teardown may be initiated by either virtual router 21 or virtual router 22 and is accomplished by sending a single Stop Control Connection Notification ("StopCCN") control message. The receiver of a Stop Control Connection Notification control message must send a Zero Length Body Acknowledgement message to acknowledge receipt of the message and maintain enough control connections to properly accept Stop Control Connection Notification retransmissions over at least a full retransmission cycle in case the Zero Length Body Acknowledgement message is lost.

For one embodiment of the invention, the entire service tunnel may be shut down and all sessions on the service tunnel can be shut down by sending the Stop Control Connection Notification control message. Thus, for that embodiment, it is not necessary to teardown each session (such as session 144) individually when tearing down the whole service tunnel.

For one embodiment of the present invention, virtual routers 21 through 23 each contain network process servers containing application specific integrated circuit processors.

For one embodiment of the invention, service tunnels 30 through 32 allow the performance monitoring of packet transmissions. For example, the number of packets received and transmitted at each end of the service tunnels can be monitored in order to see how many packets have been lost within the network. For another embodiment, the roundtrip time of packets over the service tunnel can be monitored using timestamps. Also, the roundtrip time can be measured by echoing packets back and forth across a service tunnel. A time stamp can be used to stamp the time that a packet enters the service tunnel and a time stamp can be used when the packet is received back over the service tunnel. The average round trip time can then be calculated. Maximum and minimum round trip times give an indication of jitter. This information is useful for administration of the network so that performance of the network can be tuned.

For an alternative embodiment of the invention, redundant service tunnels can be established in order to have backup tunnels in case of service disruptions.

For an alternative embodiment, call forwarding can be implemented using a two-segment tunnel. For that alternative embodiment, tunnels can be segmented and packets can be forwarded over new segments of the tunnels. This alternative embodiment would be useful for cell phones, PDAs, wireless, and mobile IP devices. Methods can be implemented to predict where tunnel segments will be needed as a cell phone moves across geographical areas.

For another alternative embodiment of the present invention, tunnel relays are created to relay information from one tunnel to another.

For another alternative embodiment of the invention, the service tunnels 30, 31, and 32 can transport virtual private networks as sessions, wherein the virtual private networks transport information according to MPLS rather than according to pure IP. This contrasts with having network 12 being an MPLS network, which is another alternative embodiment of the present invention.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
    establishing a connection between a customer premise router and a service provider router, wherein the service provider router determines where data from the customer premise router is destined;
    using in the service provider router an inner internet protocol (IP) destination address in a private IP packet received from the customer premise router to select which of the plurality of virtual private routers, service tunnel, and service tunnel session to use to have the private IP packet reach the inner IP destination address and having the service provider router encapsulate the IP packet in a data message;
    using a selected virtual router information within a payload of the data message to select from stored information which one of a plurality of customer premises routers to use to have the private IP packet reach the inner IP destination address;
    establishing a service tunnel between service provider routers, the service provider router being in a connectionless network, wherein the service tunnel transmits private IP traffic associated with hosts of the customer premise router, the transmission being transparent to the customer premise router and the hosts; and
    transporting private IP packets over the service tunnel in accordance with selected respective private IP services.

2. The method of claim 1, wherein the connectionless network is an internet protocol (IP) network.

3. The method of claim 1, wherein the connectionless network is a multiprotocol label switching (MPLS)-network.

4. The method of claim 1, wherein the service tunnel is a modified layer two tunneling protocol (L2TP) tunnel.

5. The method of claim 4, wherein the modified L2TP tunnel supports multiple L2TP tunneling sessions within the modified L2TP tunnel.

6. The method of claim 1, wherein the private IP services comprise connectivity and addressing services.

7. The method of claim 6, wherein the private IP services further comprise reachability and forwarding services.

8. The method of claim 7, wherein the private IP services further comprise premium services.

9. The method of claim 8, wherein the premium services comprise priority and quality of service.

10. The method of claim 8, wherein the private IP services further comprise peering services.

11. The method of claim 1, wherein the private IP packets contain data, voice, or video information.

12. The method of claim 1, wherein the private IP packets are each encapsulated in an encapsulation services packet and a service tunnel packet.

13. The method of claim 1, wherein establishing a service tunnel for private IP services over a connectionless network comprises:
    (1) establishing a control connection between at least two network devices to form a tunnel; and
    (2) establishing a session between the at least two network devices.

14. The method of claim 13, wherein establishing a control connection further comprises setting a service type for the service tunnel.

15. The method of claim 13, wherein establishing a session further comprises setting a service profile for the service tunnel.

16. The method of claim 13, further comprising changing the session without tearing down the service tunnel.

17. The method of claim 1, further comprising tearing down the service tunnel after the private IP packets are transported over the service tunnel.

18. A method for transporting packets, comprising:
    having virtual private routers advertise to each other which virtual private networks they handle and which inner internet protocol (IP) addresses on those virtual private networks they handle;
    having a first customer premises router send a private IP packet to a first virtual private router of the virtual private routers;
    having the first virtual router use an inner IP destination address in the private IP packet received from the first customer premises router to select from stored information which virtual private router, service tunnel, and service tunnel session to use to have the private IP packet reach the inner IP destination address;
    having the first virtual router encapsulate the private IP packet in an encapsulation services packet;
    having the first virtual router encapsulate the encapsulation services packet in a service tunnel packet;
    having the first virtual router encapsulate the service tunnel packet in a data message;
    transporting the data message over the selected service tunnel session within the selected service tunnel to a selected virtual router of the virtual routers;
    having the selected virtual router use information within a payload of the data message to select from stored information which customer premises router to use to have the private IP packet reach the inner IP destination address;
    extracting the private IP packet from the payload and transporting the private IP packet to the selected customer premises router;
    having the selected customer premises router use the inner IP destination address of the private IP packet to select from stored information a destination of the private IP packet;
    transporting the private IP packet from the selected customer premises router to the destination.

19. The method of claim 18, wherein the private IP packet is transported between virtual routers over an IP network.

20. The method of claim 18, wherein the private IP packet is transported between virtual routers over a multiprotocol label switching (MPLS) network.

21. The method of claim 18, wherein the selected service tunnel is a modified layer two tunneling protocol (L2TP) tunnel.

22. The method of claim 18, wherein the private IP packet can contain data, voice, or video information.

23. An apparatus comprising:
a configured unit configured to establish a connection between a customer premise router and a service provider router, wherein the service provider router determines where data from the customer premise router is destined;
a selecting unit configured to have the service provider router use an inner IP destination address in a private IP packet received from the customer premise router to select which of the plurality of virtual private routers, service tunnel, and service tunnel session to use to have the private IP packet reach the inner IP destination address and having the service provider router encapsulate the IP packet in a data message;
a unit configured to have a selected virtual router use information within a payload of the data message to select from stored information which one of a plurality of customer premises routers to use to have the private IP packet reach the inner IP destination address;
an establishing unit configured to establish a service tunnel between service provider routers, the service provider router being in a connectionless network, wherein the service tunnel transmits private IP traffic associated with hosts of the customer premise router, the transmission being transparent to the customer premise router and the hosts; and
a transporting unit configured to transport private Internet Protocol packets over the service tunnel in accordance with selected respective private Internet Protocol services.

24. A system comprising:
a customer premise router;
means for establishing a connection between the customer premise router and a service provider router, wherein the service provider router determines where data from the customer premise router is destined;
means for having the service provider router use an inner IP destination address in a private IP packet received from the customer premise router to select which of the plurality of virtual private routers, service tunnel, and service tunnel session to use to have the private IP packet reach the inner IP destination address and having the service provider router encapsulate the IP packet in a data message;
means for having a selected virtual router use information within a payload of the data message to select from stored information which one of a plurality of customer premises routers to use to have the private IP packet reach the inner IP destination address;
means for establishing a service tunnel between service provider routers, the service provider router being in a connectionless network, wherein the service tunnel transmits private IP traffic associated with hosts of the customer premise router, the transmission being transparent to the customer premise router and hosts; and
means for transporting private IP packets over the service tunnel in accordance with selected respective private IP services.

25. A system for transporting packets, comprising:
virtual private routers which advertise to each other which virtual private networks they handle and which inner internet protocol (IP) addresses on those virtual private networks they handle;
a first customer premises router that sends a private IP packet to a first virtual private router of the virtual private routers,
wherein the first virtual router use an inner IP destination address in the private IP packet received from the first customer premises router to select from stored information which virtual private router, service tunnel, and service tunnel session to use to have the private IP packet reach the inner IP destination address,
wherein the first virtual router encapsulate the private IP packet in an encapsulation services packet,
wherein the first virtual router encapsulates the encapsulation services packet in a service tunnel packet, and
wherein the first virtual router encapsulates the service tunnel packet in a data message;
means for transporting the data message over the selected service tunnel session within the selected service tunnel to a selected virtual router of the virtual routers,
wherein the selected virtual router use information within a payload of the data message to select from stored information which customer premises router to use to have the private v packet reach the inner IP destination address;
means for extracting the private IP packet from the payload and transporting the private IP packet to the selected customer premises router,
wherein the selected customer premises router use the inner IP destination address of the private IP packet to select from stored information a destination of the private IP packet; and
means for transporting the private IP packet from the selected customer premises router to the destination.

* * * * *